Nov. 14, 1972   W. O. YOUNG, JR   3,702,654
PULL TAB PAPER
Filed Jan. 7, 1971   12 Sheets-Sheet 1
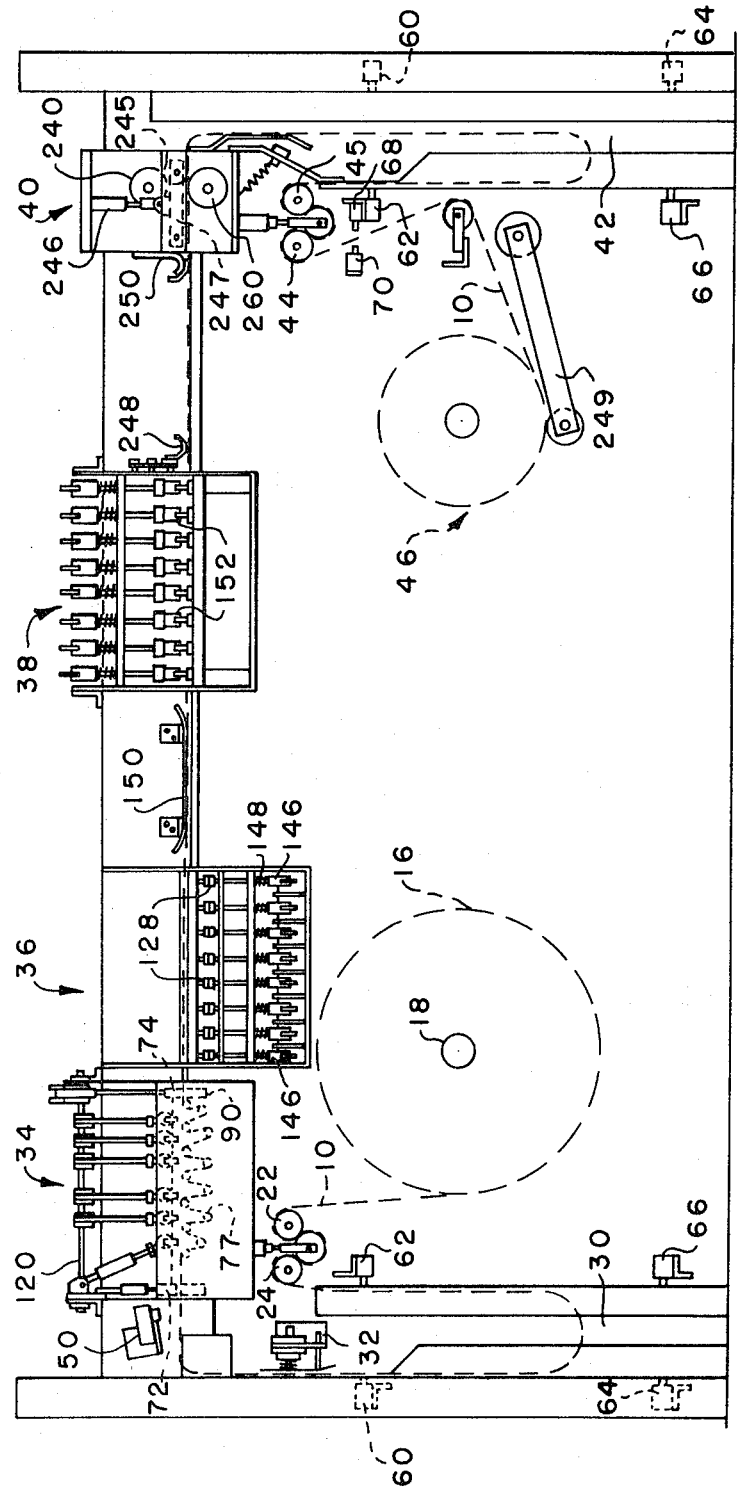
FIG. -1-
INVENTOR
WILLIAM O. YOUNG, JR.
BY
Earle R. Marden
ATTORNEY Nov. 14, 1972   W. O. YOUNG, JR   3,702,654
PULL TAB PAPER
Filed Jan. 7, 1971   12 Sheets-Sheet 2
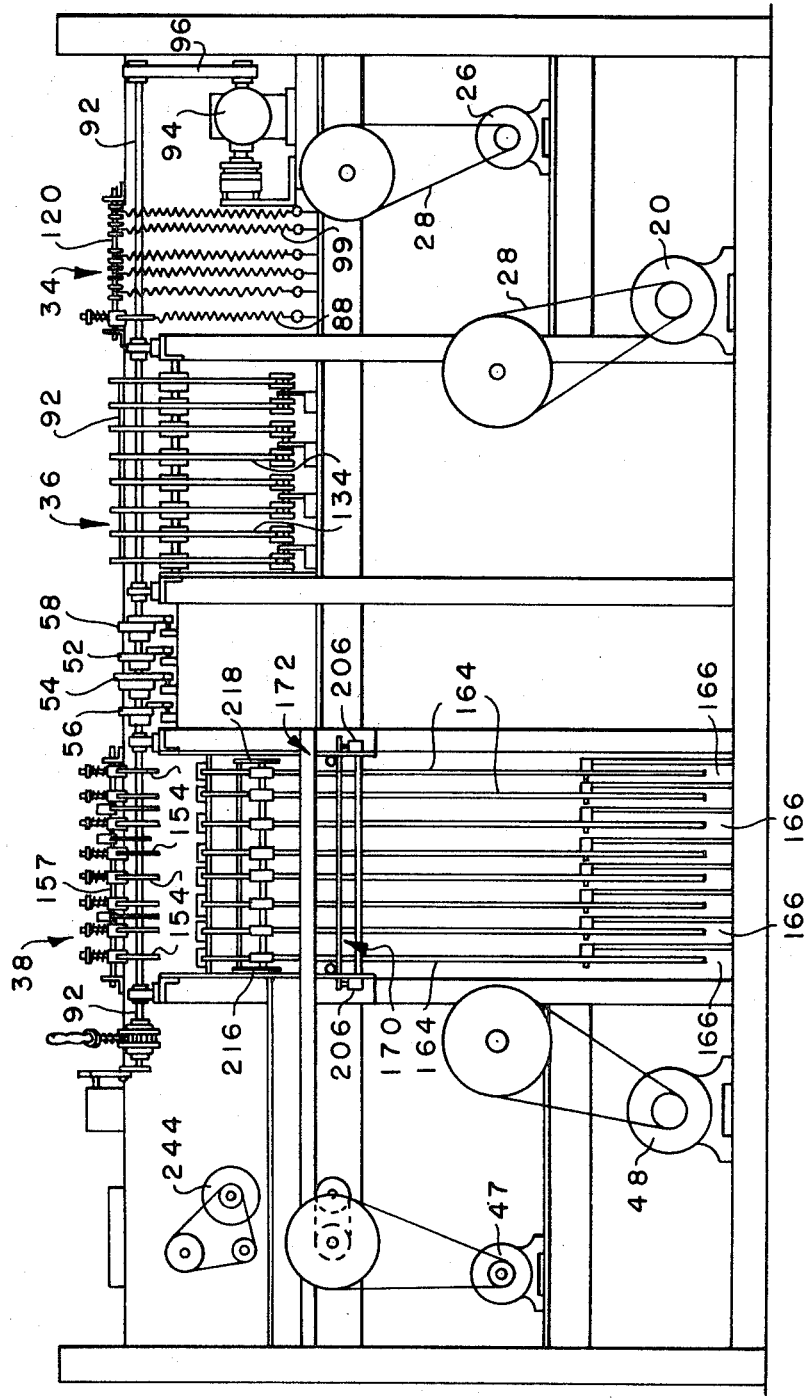
FIG.-2-
INVENTOR
WILLIAM O. YOUNG, JR.
BY
Earle R. Marden
ATTORNEY Nov. 14, 1972   W. O. YOUNG, JR   3,702,654
PULL TAB PAPER
Filed Jan. 7, 1971   12 Sheets-Sheet 3
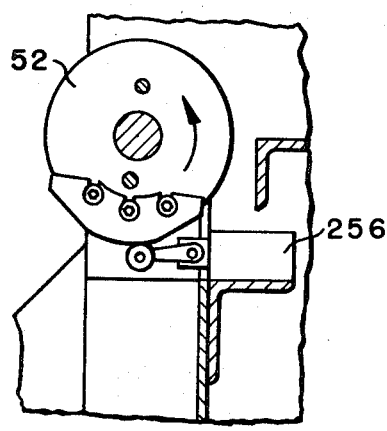
FIG.-3-
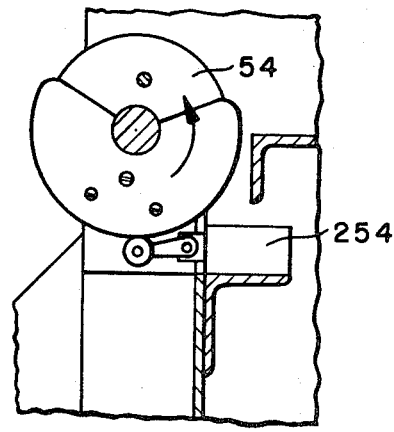
FIG.-4-
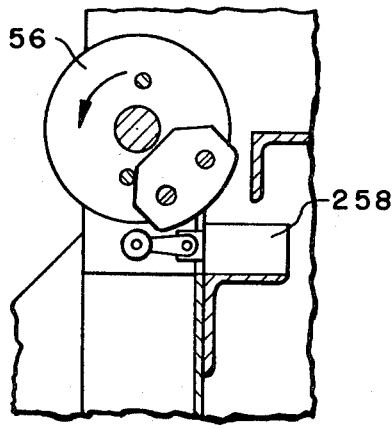
FIG.-5-
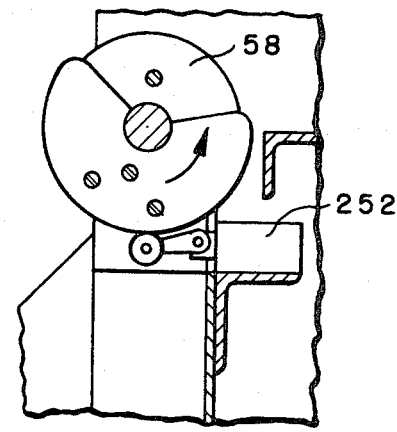
FIG.-6-
INVENTOR
WILLIAM O. YOUNG, JR.
BY
Earle R. Marden
ATTORNEY

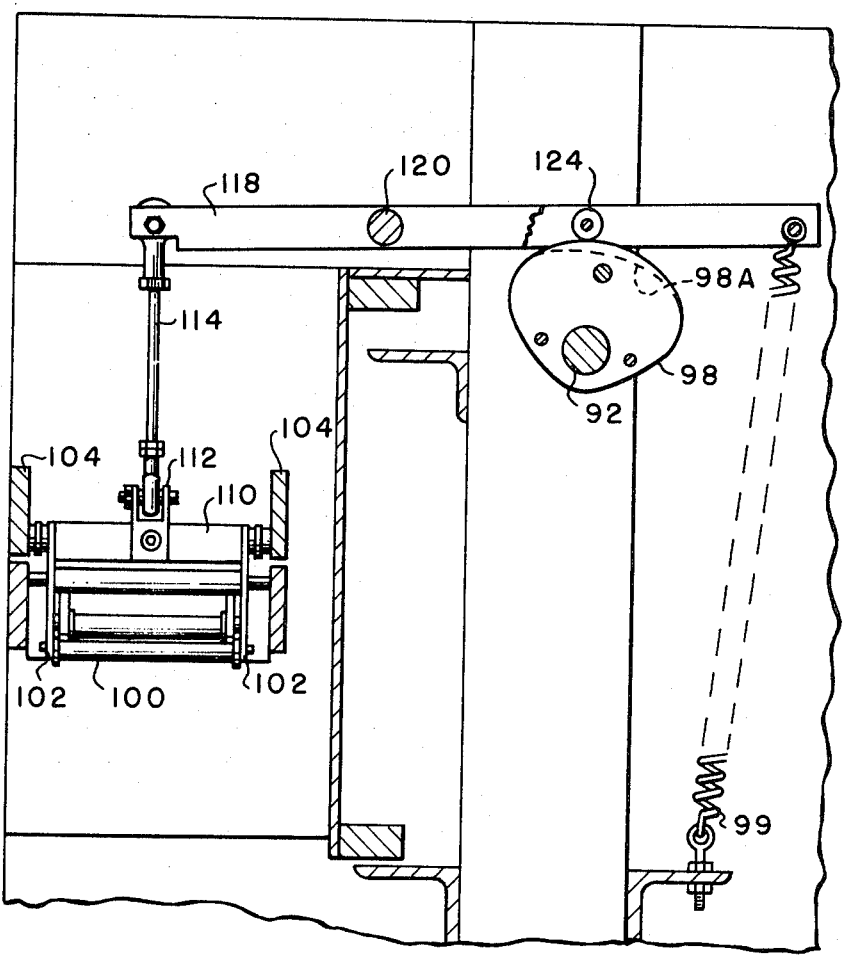
FIG.-9-
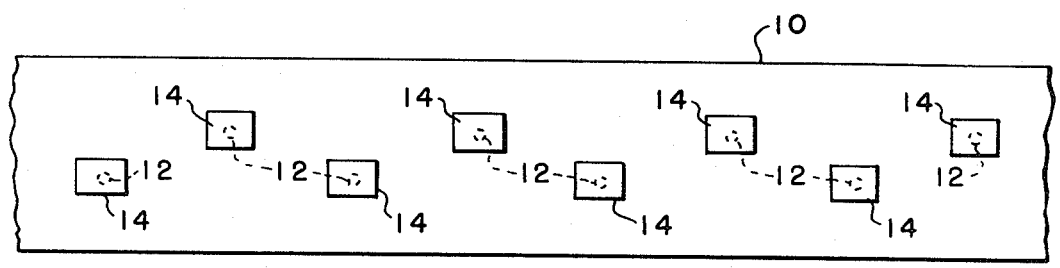
FIG.-7-

Nov. 14, 1972 W. O. YOUNG, JR 3,702,654
PULL TAB PAPER
Filed Jan. 7, 1971
12 Sheets-Sheet 6
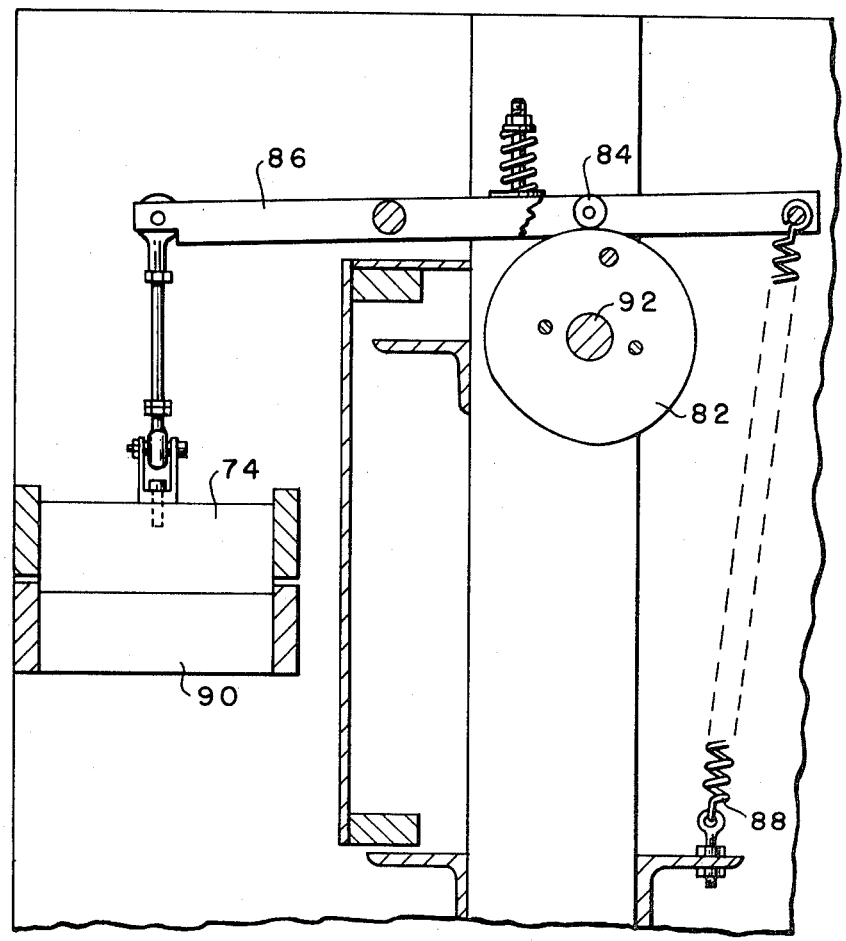
FIG.-10-
INVENTOR
WILLIAM O. YOUNG, JR.
BY
ATTORNEY

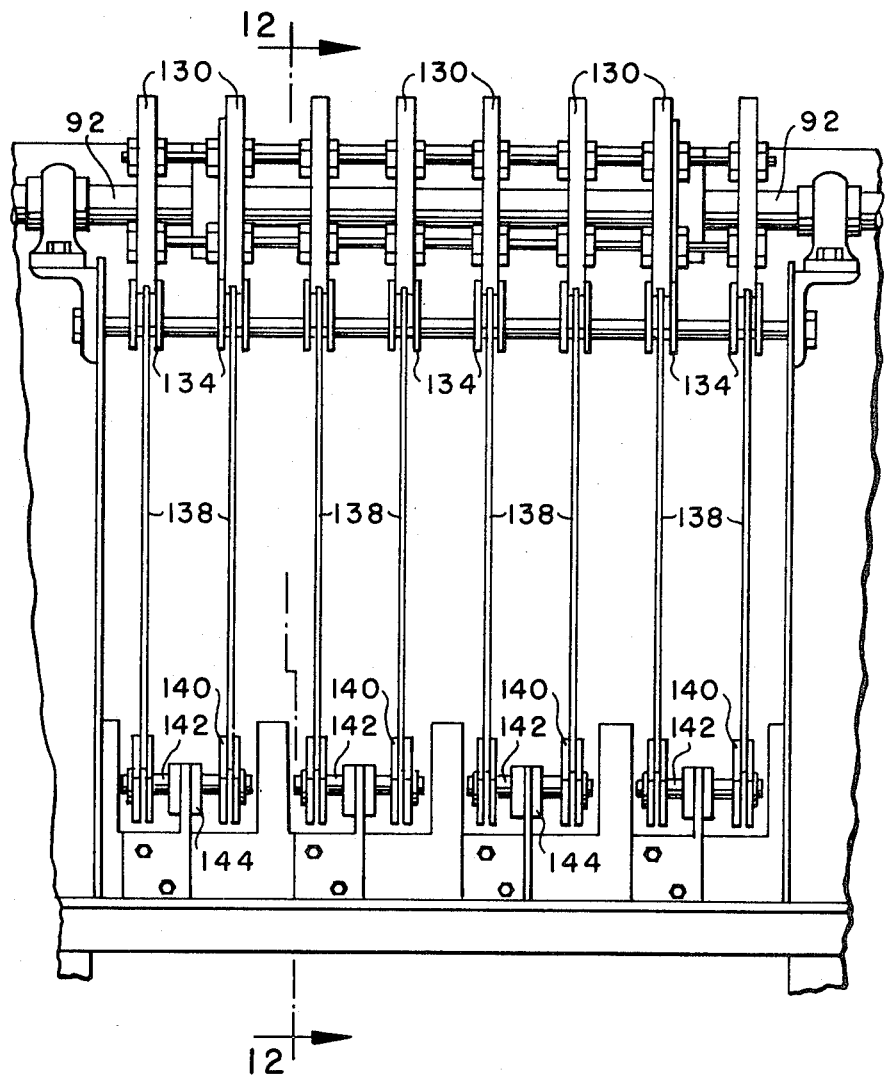
FIG.-11-

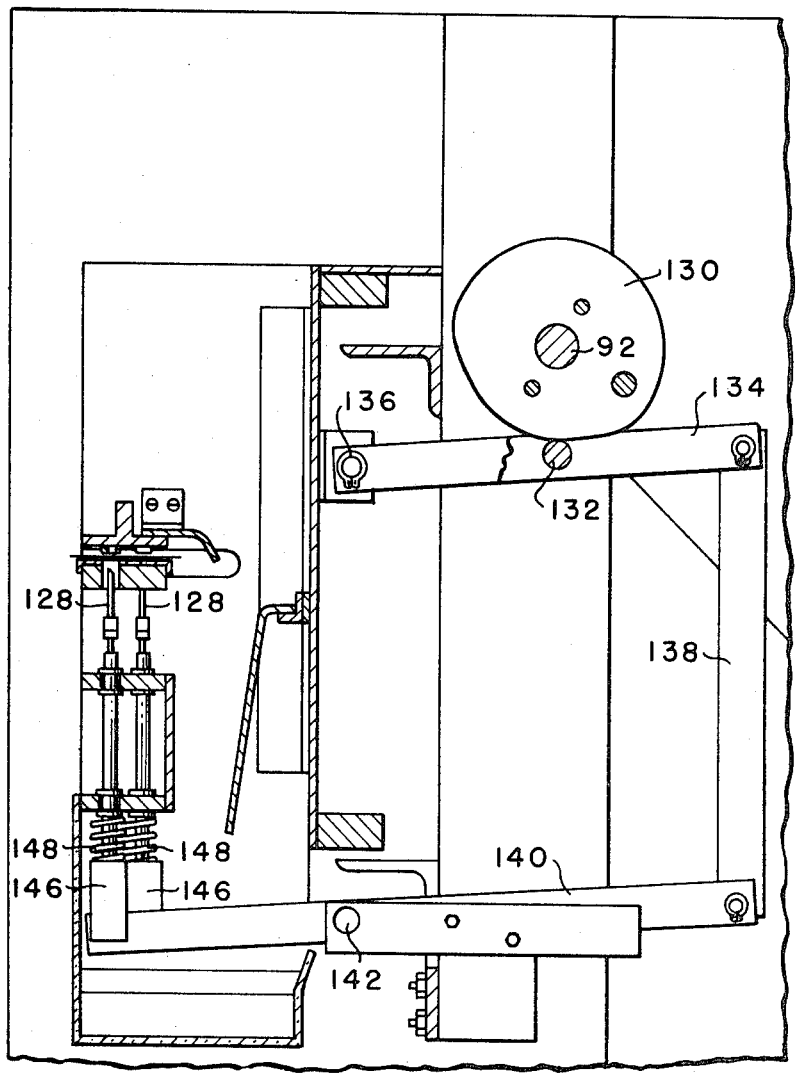
FIG.-12-

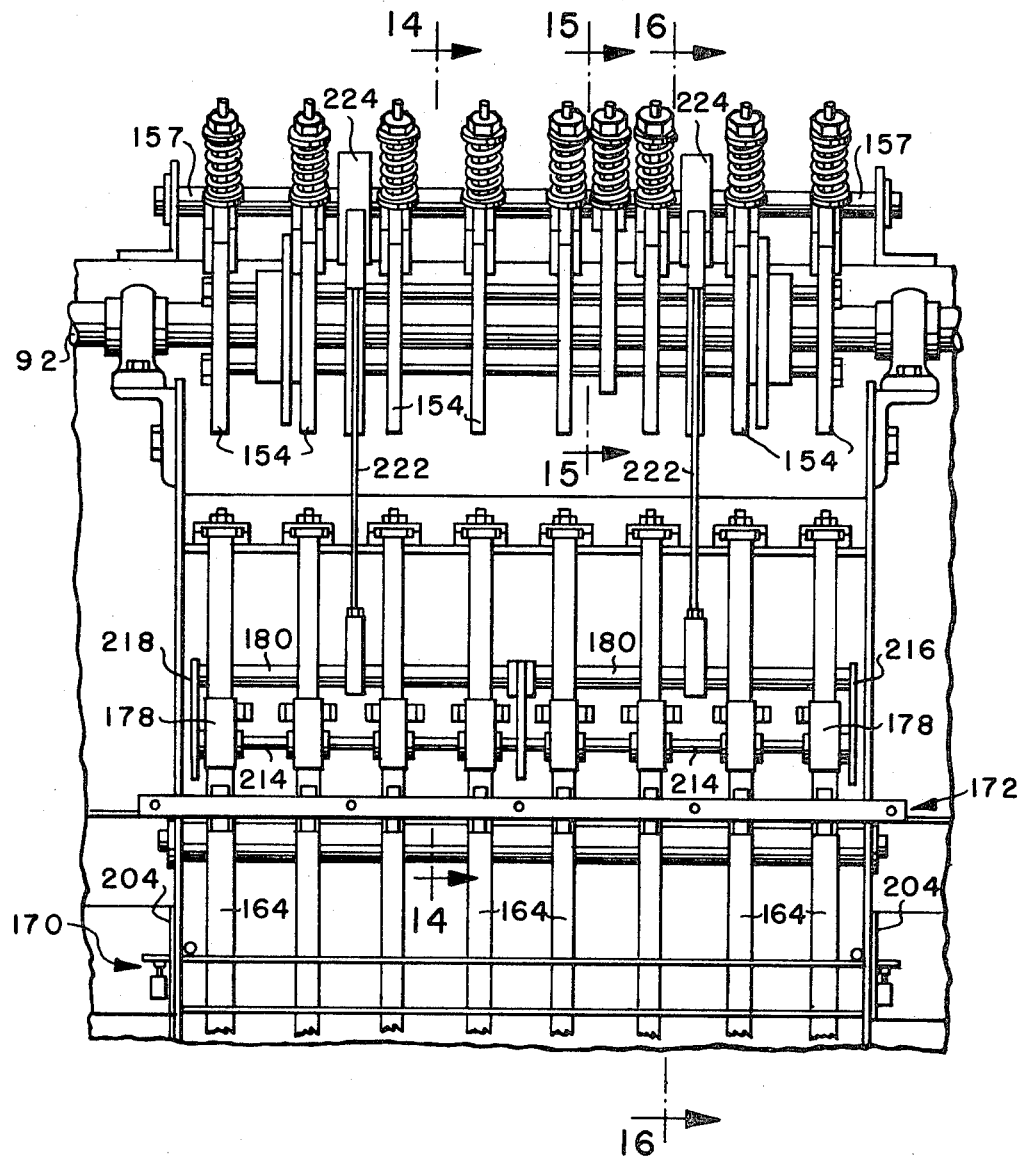
FIG.-13-

Nov. 14, 1972  W. O. YOUNG, JR  3,702,654
PULL TAB PAPER
Filed Jan. 7, 1971  12 Sheets-Sheet 10
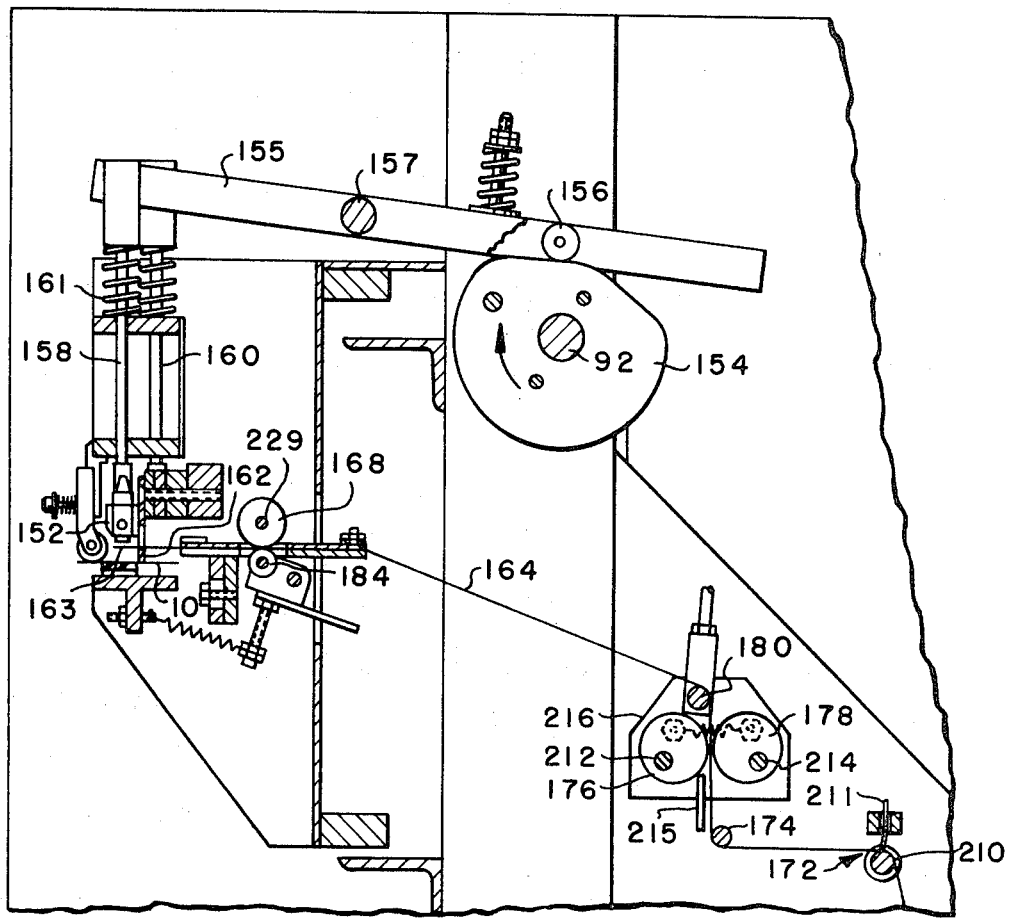
FIG.-14-
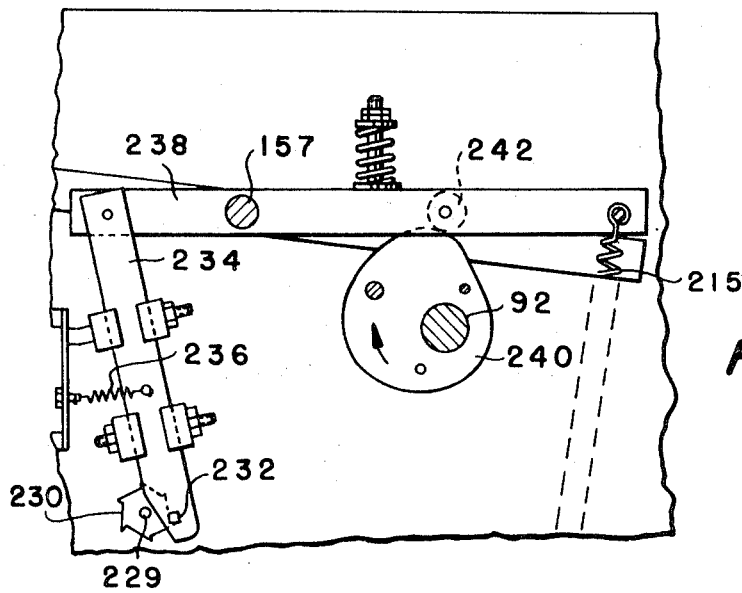
FIG.-15-
INVENTOR
WILLIAM O. YOUNG, JR.
BY
ATTORNEY

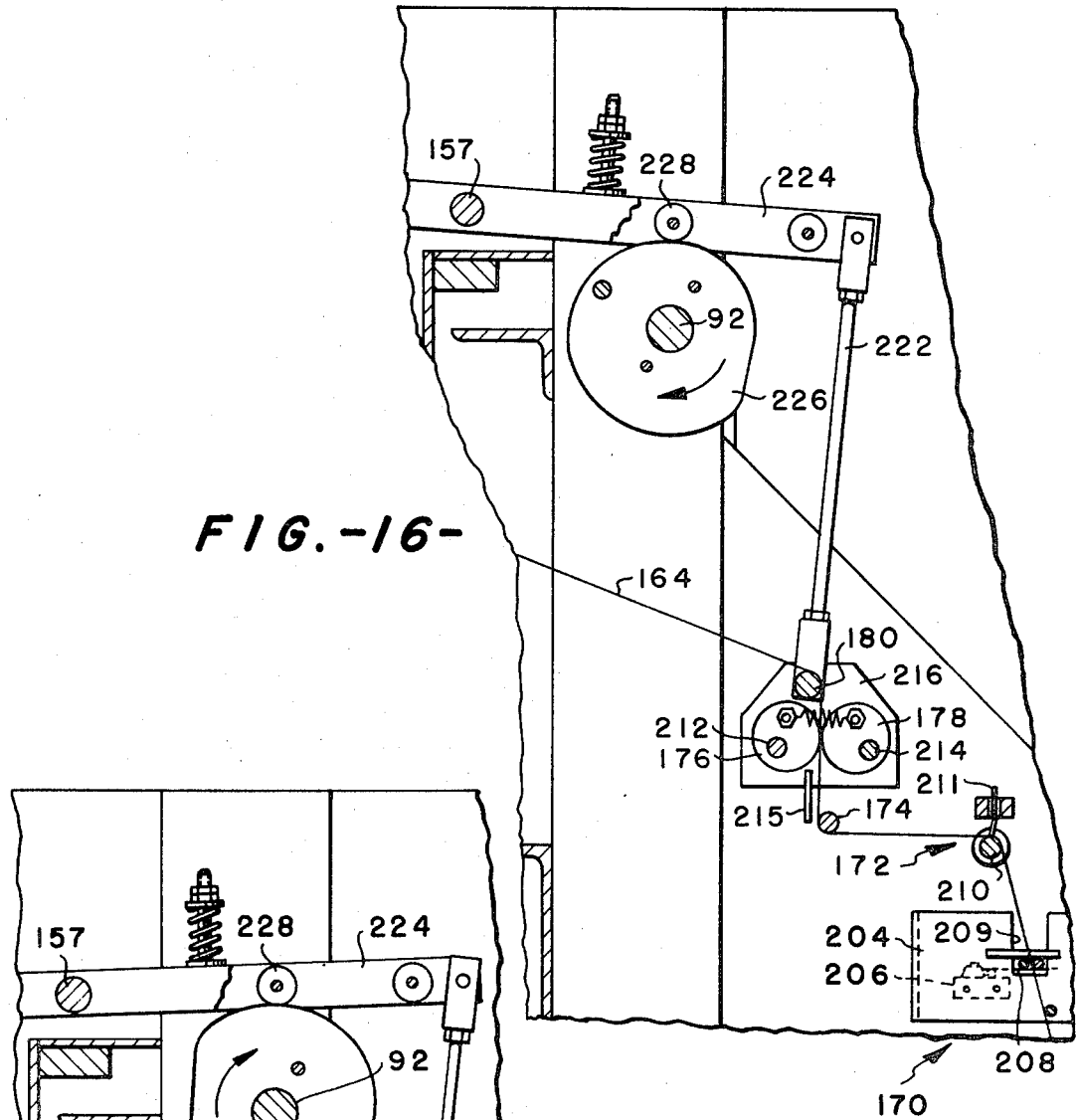
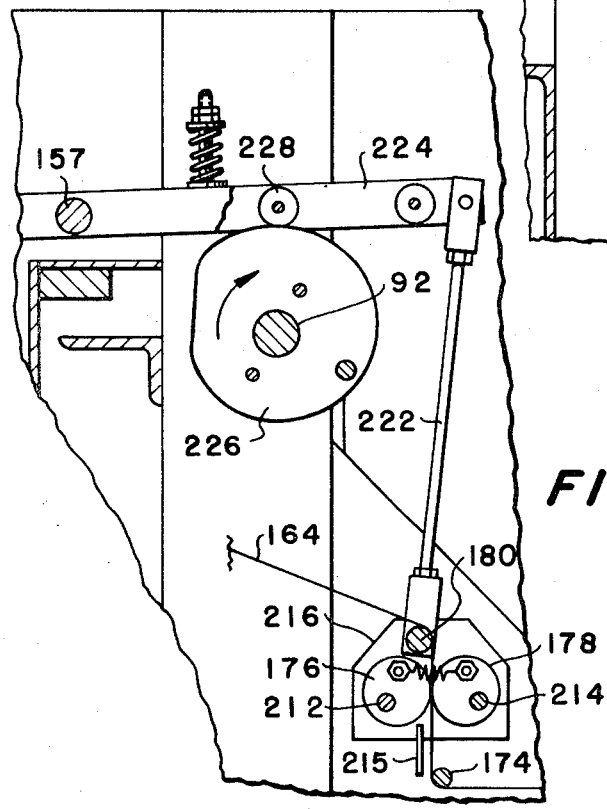

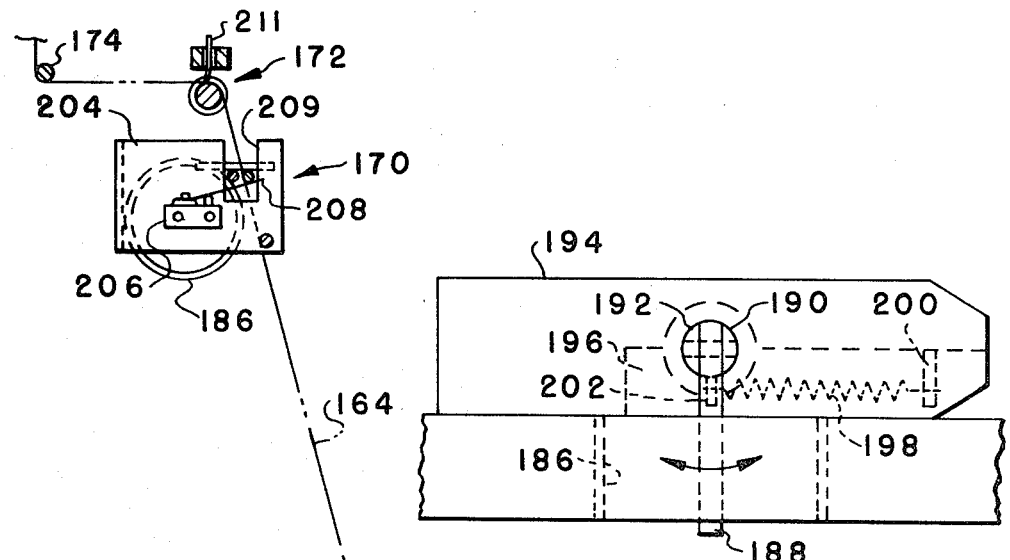
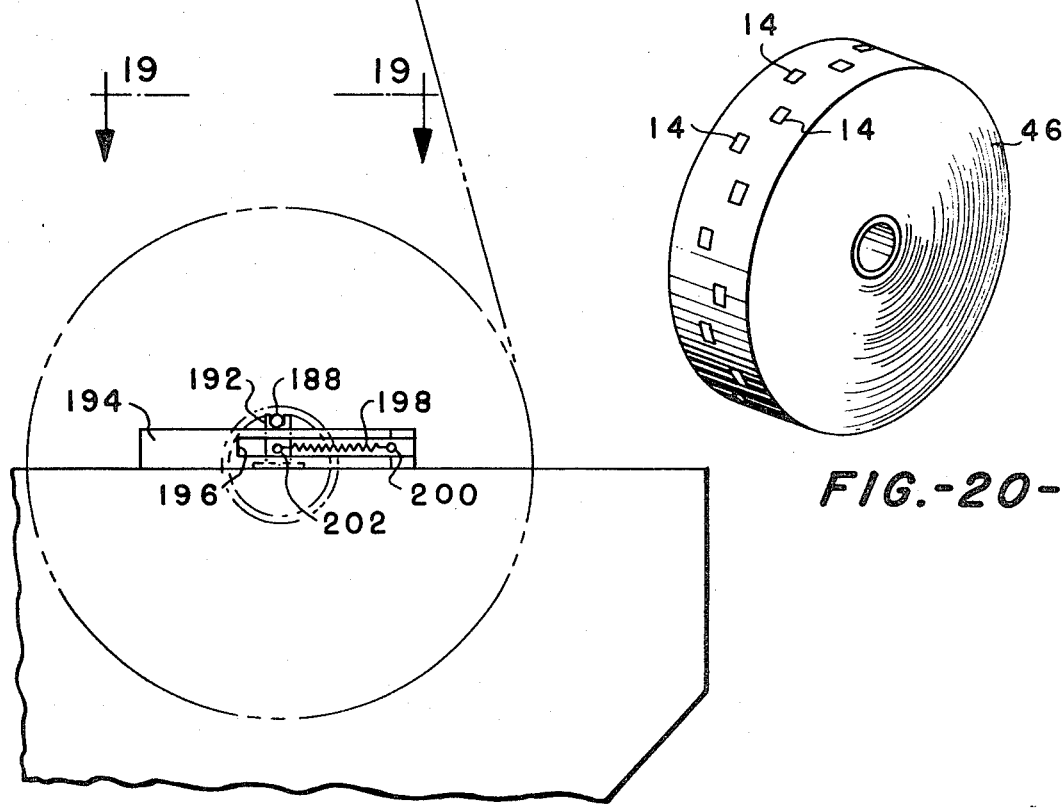

United States Patent Office 3,702,654
Patented Nov. 14, 1972

3,702,654
PULL TAB PAPER
William O. Young, Jr., Spartanburg, S.C., assignor to Deering Milliken Research Corporation, Spartanburg, S.C.
Filed Jan. 7, 1971, Ser. No. 104,645
Int. Cl. B65d 85/00, 85/67, 85/80
U.S. Cl. 206—59 F    2 Claims

ABSTRACT OF THE DISCLOSURE

A roll of packaging material which has openings therein which are covered by a pull tab for access to the interior of the package formed from the packaging material. The adjacent pull tabs on the roll of packaging material are staggered in relation to one another so that the packaging material when rolled up has stability and the proper density for maximum packaging efficiency.

---

This invention relates generally to the preparation of a continuous length of web material in which openings have been made therein for access to the contents of a package made therefrom and have a tab heat sealed thereover for removal by the consumer. In particular this invention relates to web material to be used in the construction of a tetrahedron container such as that shown in U.S. Pat. 3,166,226.

Prior to this invention the web stock for forming the package was mounted on the packaging machine and the openings and pull tabs thereover were made by the machine itself. This, of course, requires a pull tab apparatus for each packaging machine and such apparatus limited the speed of the packaging machine since the machine could only run as fast as the pull tabs were being placed over the openings being placed in the web stock.

It is therefore an object of this invention to provide a roll of web material which already has the openings therein and pull tabs placed thereover.

Other objects and advantages of the invention will become readily apparent as the specification proceeds to describe the invention with reference to the accompanying drawings, in which:

FIG. 1 is a front elevation view of the new machine to pre-apply pull tabs to a sheet of web material;

FIG. 2 is a rear elevation view of the machine shown in FIG. 1;

FIGS. 3–6 show various cam actuated switches employed to control the operation of the machine;

FIG. 7 illustrates a strip of packaging material with pull tabs sealed over the openings therein;

FIG. 9 is a cross-sectional view taken on line 9—9 of FIG. 8 showing the accumulator cam;

FIG. 10 is a cross-sectional view taken on line 10—10 of FIG. 8 showing the exit clamp;

FIG. 11 is a rear elevation view of the hole punch section;

FIG. 12 is a cross-sectional view taken on line 12—12 of FIG. 11 showing the punch cam;

FIG. 13 is a rear view of the pull tab heat sealing unit and the pull tab tape feed;

FIG. 14 is a cross-sectional view taken on line 14—14 of FIG. 13 and shows the heat seal cam;

FIG. 15 is a cross-sectional view taken on line 15—15 of FIG. 13 showing a pull tab tape metering cam system;

FIGS. 16 and 17 are cross-sectional views taken on line 16—16 of FIG. 13 showing the pull tab tape puller cam;

FIG. 18 is a cross-sectional view showing the tape knock-off device;

FIG. 19 is a top view of the tab tape roll support; and

FIG. 20 shows a perspective view of a roll of material with pull tabs applied thereto.

Figure 8:
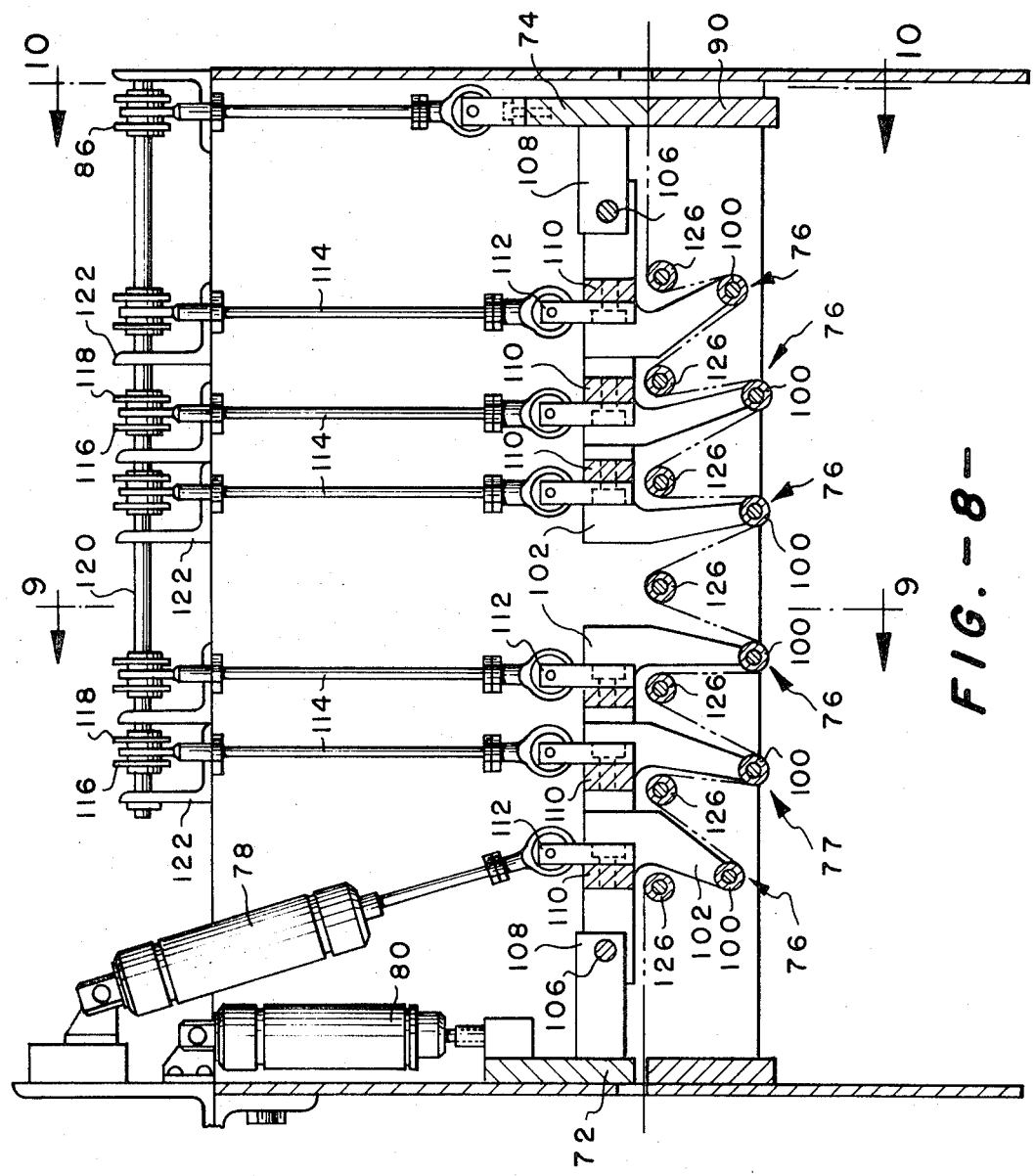
FIG. 8 is a blown-up front cross-sectional view of the paper accumulator section of the machine shown in FIG. 1.

As pointed out briefly, this invention is directed to packaging material to be formed into tetrahedron containers and is preferably laminated stock material with one lamina being a layer of thermoplastic material substantially impervious and inert to the contents of the container formed from said material. The laminated material used to form these containers is ordinarily one or more layers of paper laminated to layers of polyethylene or polypropylene so that the face of the laminated material which will form the inner face of the container will present a liquid impervious face to the contents. The outermost lamina is ordinarily moisture resistant, either by being formed of a layer of wet strength paper or a lamina of thermoplastic materials such as wax or polyethylene, or both. The container will bear the conventional transverse sealed seams and longitudinal, inside face to inside face, or lapped seam. At the apex which is uppermost of the wall which faces upward when the container rests on the opposite wall, there is provided an access aperture in the wall. This will ordinarily be a small round hole which, if the container is a pint or half-pint size, will be about the size which will receive a drinking straw. The opening is sealed by a tab covering the opening and bonded to the outer face of the portion of the wall surrounding the opening by the bonding of the portion of the thermoplastic material forming at least one face of the tape to the outermost lamina of the container, thus providing a liquid tight seal. The tape is ordinarily formed of paper laminated to polyethylene or paper impregnated with polyethylene, polypropylene, or wax.

Looking now to the drawings, FIGS. 1 and 2 represent schematically the front and back, respectively, of the machine which produces the web of material 10 shown rolled in FIGS. 1 and 20 and show unrolled in FIG. 7. As described above, the material 10 is laminated and the purpose of this invention is to provide a plurality of staggered openings 12 therein and heat seal a tab 14 thereover to provide a seal until it is desired to gain access through the opening 12 into the contents of the container formed from the web material. It should be noted that each adjacent opening and pull tab is staggered in relation to the next adjacent opening and pull tab. This arrangement is necessary in order to be able to roll up a large roll of this material and still maintain stability and the proper tensity. The pull tabs balance one another so that when the material is rolled up the roll of material 10 will have substantially the same diameter on both sides. If the tabs were not staggered the roll would have a combined thickness of the pull tabs and the web of material which would tend to distort or telescope sideways making it very difficult to run on a packaging machine. Also a roll of material with pull tabs not staggered would be difficult to ship and handle.

As shown in FIGS. 1 and 2 a roll 16 of laminated paper stock 10 is mounted on a shaft 18 driven in a counterclockwise direction through an eddy current clutch (not shown) by a motor 20 to control the tension in the paper 10 as it is being pulled off the roll by the drive rolls 22 and 24 which are driven by motor 26. Both the motors 20 and 26 drive their respective rolls through suitable drive belts 28. As is well known in the art, the eddy current clutch for the motor 20 will brake the rotation of the roll 16 to maintain the desired tension in the paper stock 10.

The paper stock 10 travels successively through the paper supply chamber 30, tension control 32, accumulator chamber 34, punch chamber 36, pull tab heat seal chamber 38, driven roll section 40, paper collection chamber 42, metering rolls 44 and 45 onto the take-up roll 46 which is driven by the motor 48. Metering rolls 44 and 45 are driven by a suitable motor 47.

As will be explained in detail hereinafter, the basic machine operations are controlled by photocell 50 and cams 52, 54, 56 and 58 shown in detail in FIGS. 3–6, respectively. The control arrangement is designed so that an exact amount of paper is being accumulated in the accumulator section 34 for the next cycle while the leading portion is simultaneously being punched in the punch chamber 36 while pull tabs 14 are being heat sealed over the openings 12, punched in a previous cycle, in the heat sealing chamber 38.

Since the drive rolls 22, 24 and 44, 45 operate continuously while the punching and sealing opeation is intermittent it is desirable to have a loop of web material 10 in both the paper supply chamber 30 and the paper collection chamber 42. To control the amount of loop in such chambers a photocell 60 and light source 62 are located in the upper portion of the chambers 30 and 42 and a second photocell 64 and light source 66 are located near the bottom of each chamber. When the loop increases to a point where it drops down to block the light from the light source 66 as well as the light source 60 the speed of the motor 26 will be decreased to decrease the speed of the rolls 22 and 24, and the speed of motor 47 will be increased to increase the speed of rolls 44 and 45. Conversely, if the loop rises to a point above the light source 60 and both the photocells 62 and 66 are receiving light then the speed of the motor 26 will be increased and the speed of motor 47 decreased to allow the web material 10 to accumulate in the chambers 30 or 42 to lower the position of the loop of web material therein.

As discussed above, the photocell arrangement controls the speed of the rolls 44 and 45 but a further control in the speed of the rolls 44 and 45 is exerted by the use of both an eddy current clutch and an eddy current brake on the motor 47. If the speed of the rolls 44 and 45 varies from a set point, the eddy current brake or the eddy current clutch will act to maintain the tension depending on which side of the set point the speed has varied to.

Another photocell 68 and light source 70 are employed on the output side of the rolls 44 and 45 to scan the web material which has been punched and tabbed to determine whether some of the openings therein have not been sealed over with pull tabs 14. If a hole in the web material 10 which has no tab thereover passes between the photocell 68 and light source 70 the light from the light source 70 will be detected by the photocell 68 and a signal will be generated which can be used either to shut off the machine or to actuate a signal to notify the operator of such defect.

The tension of the web material being supplied to the accumulator 34 is critical since it is desired to accumulate an exact amount of paper in the accumulator so that the pull tabs will be located in the correct position, and therefore a tension control 32 is employed to keep the slack out of the web material in the accumulator. The tension control 32 is a commercially available type which employs a spring loaded plate 71 to exert a force normal to the web material as it is being delivered to the accumulator.

The accumulator chamber 34 is located downstream of the tension control 32 with the paper flow therethrough being controlled by the photocell 50, the entrance clamp 72 and the cam actuated exit clamp 74. As discussed previously, the purpose of the accumulator chamber 34 is to accumulate a desired length of web material 10 for the next punching cycle. FIGS. 8–10 show the accumulator chamber 34 when the accumulators 76 and the trim cylinder 78 are extended and are about to retract before the trimmer 77 completes pulling in the paper prior to the closing of the entrance clamp 72 to confine the desired length of web material in the chamber 34.

The entrance clamp 72 is actuated by the piston 80 while the movement of the exit clamp 74 is controlled by the cam 82 (FIG. 10) which acts on the follower 84 to pivot the lever 86 against the bias of spring 88 to close the exit clamp 74 to grip the paper against the fixed mating clamp 90. The cam 82 is so designed to co-act with the other movements of the machine.

It should be noted (FIG. 2) that the mechanical mechanisms to cause the required movements of the elements of the accumulator chamber 34, the punch chamber 36, cams 52, 54, 56, 58 and the pull tab heating sealing section 38 are all mounted in operative relationship with extended shaft 92 which is driven by motor 94 through pulley belt 96.

Looking at FIGS. 8 and 9, each of the accumulators 76 except trimmer 77 are driven in its downward movement by a cam 98 mounted on the extended shaft 92 and rotating therewith. Trimmer 77 is driven by cam 98a. Each accumulator 76 and trimmer 77 consists of a finger member having a roller 100 rotatably mounted at the bottom thereof between side plates 102. Side plates 102 in turn are mounted to horizontally extending support members 104 which are pivotally mounted at 106 to a support member 108. Another support member 110 extends between the side walls 102 and supports a U-shaped bracket 112 which pivotally supports a connecting arm 114. Connecting arms 114 extend upwardly and are pivotally supported between a pair of lever arms 116 and 118 rotatably supported on shaft 120 supported on the top of the machine by suitable brackets 122. A cam follower 124 is mounted inside a pair of levers and is engaged by cams 98 and acts against the bias of springs 99. Trimmer 77 is constructed like accumulator 76 except cam 98a delays the action of the trimmer.

The side plates 102, from the pivot points 106 toward the middle of the accumulator chamber 34, fit inside the next adjacent side plates 102 toward the pivot points 106, and are so spaced so that the rollers 100 will push web material down between the rollers 126.

In the preferred form of the invention it is desired to punch and heat seal eight pull tab openings at one time as shown in FIG. 7, but any reasonable desired number can be made. It is desired that each opening in the web material is staggered in relation to the next adjacent opening. To accomplish the desired punching of the web material eight punch members 128 are mounted in the punch chamber 36 to simultaneously punch eight openings in the web material from the bottom thereof. Looking at FIGS. 11 and 12 the punch mechanism is shown in detail. The timing of the punch operation is controlled by the cams 130 mounted on the shaft 92 which contacts the followers 132 mounted between lever arms 134 which are pivotally mounted at 136. Pivotally connected between the levers 134 at the other end thereof is a connecting arm 138 which pivotally connects the lever arms 134 to the lever arms 140. The lever arms 140 are pivotally connected to a stub shaft 142 mounted in suitable bearings 144 supported on the frame of the machine. When the cams 130 force the lever arms 134 downwardly the lever arms 140 will pivot upwardly through the action of connecting arm 138 to force the punch holder 146 upwardly against the bias of springs 148 to force the punch members 128 through the paper. Then the cams 130 will continue to rotate and the springs will return the punch members to the down position.

From the punch chamber 36 the web material is indexed to the pull tab seal chamber wherein the pull tab 14 is heat sealed to the web material 10 over the opening 12. A plate 150 is mounted on the machine frame between the chambers 36 and 38 to prevent the web material from buckling so that the previously punched opening will be in proper position under the heater platens 152.

At the appropriate time when the cams 154, mounted on the shaft 92 (FIG. 14), rotate to the desired position, the cam surface will push the follower 156 upwardly, thereby pivoting the lever arms 155, pivotally connected to shaft 157, counterclockwise to push the heater platen arms 158 and 160 downwardly against the bias of springs 161 to push the tape portion 163 down against the blades 162 to cause the blades 162 to sever off eight pull tabs 14 from the tape material 164 and the heater platens 152 to heat seal the severed pull tabs 14 over the openings 12.

The pull tab material 164 comes in rolls and is rotatably mounted in bins 166 (see FIG. 2) at the rear of the machine and is delivered under the heater platens 152 by a drive roll 168 in a manner hereinafter explained. In its path of travel from the bins 166 to the platens 152 the pull tab material travels successively between the spaced rods of the stop motion actuator wire 170, over pull back preventor 172, under guide rod 174, between eccentrically mounted rolls 176 and 178, over the rod 180 and through the drive roll 168 and nip roll 184 into position under the heater platen 152.

The pull tab material 164 is wound on a cardboard tube 186 and is mounted on a rod 188 projecting into the bins 166. Looking at FIGS. 18 and 19 the rod 188 is pinned by pin 190 into a cylindrical member 192 which is mounted into a plastic support member 194. The plastic support member 194 is rigidly attached to the partition between the bins. The support member 194 has a groove 196 therein to accommodate a spring 198 hooked to a pin 200 at one end and another pin 202 integral with the cylindrical member 192. The rod 188 is capable of pivotal movement up and down while the cylindrical member 192 is capable of rotational movement. As shown in the position of FIG. 19 the rod 188 is in its operation and the cylindrical member is held against further movement by a stop (not shown). When it is desired to load the bins 166 with a new roll of pull tab material 164, the roll is placed in the bin with its axis of rotation perpendicular to the bin side walls. Then the roll is pushed forward against the rod 188 causing the cylindrical member to rotate against the bias of the spring 198 until the rod 188 enters the inside of the hollow tube 186. Then the spring 198 rotates the cylindrical member 192 and the rod 188 to the operative position shown in FIG. 19.

As shown in FIG. 18 the upward movement of the rod 188 cooperates with the stop motion actuator 170 to provide for a means to stop the machine when any of the rolls of pull tab tape run out. Basically the stop motion device consists of two plates 204 mounted on opposite sides of the rear of heat seal chamber 38 and each supporting a switch 206. Switches 206 each have an actuator arm 208 which extend adjacent a notch 209 in the plates 204. The stop motion actuator wire consists of two elongated rods connected together to span the width of the heat seal chamber and resting on the actuator arms 208 of the switches 206 to hold them down in normal operating position. The end of the roll of pull tab material 164 is connected to the tube 186 so that when the pull tab material runs out the tube will be pulled upwardly until it reaches the position shown in FIG. 18 whereat it lifts the stop motion wire 170 allowing one of the actuator arms 208 to lift thereby opening the switch 206 associated therewith and thereby shut off the machine until a new roll is replaced by an operator.

Mounted above the stop motion actuator wire 170 is the pull tab material pull back preventor or snubber 172 to prevent the tension in the material and rocking movement of the tape roll from pulling the material back beyond the preventor 172. Basically it consists of an elongated bracket which supports a plurality of plastic members 211 which tend to press the pull tab material against the elongated rod member 210.

From the pull back preventor the pull tab material passes between the eccentrically mounted rolls 176 and 178. A pair of rolls 176 and 178 is required for each heat sealing position and is eccentrically mounted on shafts 212 and 214 which are supported in end plates 216 and 218. The rod member 180 also extends between end plates 216 and 218 and has two connecting rods 222 pivotally connected thereto. At the other end the connecting rods are pivotally connected to a lever arm 224 which in turn is pivotally connected to shaft 157. Cams 226 contact follower 228 to cause the eccentrically mounted rolls to be pulled upwardly (see FIG. 17) when pull tab material is needed for the next machine cycle. The cams 226 are so desired to pull the rolls 176 and 178 upwardly just prior to the actuation of the drive roll 168 so that there will be a supply of pull tabs available when the drive roll 168 is actuated.

The rolls 176 and 178 are eccentrically mounted on shafts 212 and 214 and spring loaded toward one another so that on the upward movement the rolls will be in nip forming relationship so that pull tab material will be pulled from the supply roll by the rolls 176 and 178. Then the rolls are allowed to return to the position shown in FIG. 16 where roll 176 will hit the stop member 215 causing it to rotate away from roll 178 and allow the pull tab material to lay slack between the rolls 176, 178 and the pull back preventor 172. Then when the drive roll 168 is actuated this accumulated slack will be pulled out through the spring loaded rolls 176 and 178. The rolls 176 and 178 are eccentrically mounted to pull the tab material into position against the inertia of the pull tab material supply roll.

The drive rolls 168 for each heat sealing unit are mounted on shaft 229 (FIGS. 14 and 15) and are driven intermittently by ratchet 230. The ratchet 230 is moved incrementally by pawl 232 mounted on lever arm 234 biased toward the ratchet by spring 236. Lever arm 234 is pivotally connected to lever arm 238 which is pivotally mounted on shaft 157 and is pivoted by the cam 240 mounted on the shaft 92. In FIG. 15 the cam 240 has pushed the follower 242 and lever arm 238 upward to index the ratchet 230 and consequentially the drive roll 168. Then the cam 240 will continue to rotate allowing the spring 243 to pull the lever arm 234 upwardly in preparation for the next cycle.

The flow of web material 10 from the accumulator chamber 34 into the paper collection chamber 42 is controlled by the roll 245 (FIG. 1) which is driven either by roll 240 or 260 which in turn are driven continuously by motor 244. Roll 245 is rotatably mounted in pivot arm 247 pivoted by piston member 246. When the roll 245 is down paper is being pulled and when in the up position it engages the roll 240 to maintain its speed for the next downward movement to pull paper. Located between the heat seal chamber 38 and driven roll chamber 40 are snubbers 248 and 250 to prevent pull back of the paper and maintain the paper in a substantially flat position.

As described hereinbefore the web material passes into the paper collection chamber 42 and is delivered to the take-up roll 46 by the metering rolls 44 and 45. Operably associated with the takeup roll 46 is a torque detector 249 to measure the diameter of the roll 46 in order to determine the amount of torque required on the roll 46 for constant tension take-up of the web material to provide a roll of pre-applied pull paper such as that shown in FIG. 20.

OPERATION

For the sake of discussion, assume the machine has just completed a cycle and the piston 246 has just been actuated so that roll 245 has just pulled the web material 10 into proper position so that punched openings 12 lie under the heater platens 152 ready to be sealed over with pull tabs 14. Each of the drive rolls 168 has been actuated to place tab material 164 over each of the punched openings. The cams 82, 130 and 154 are starting to act against their respective lever arms 86, 134 and 155 to start the movement of the exit clamp 74, the punch unit and the heat sealing unit. Then the exit clamp 74 closes as shown in FIG. 10 while the cam 58 allows the switch 252 (FIGS. 2 and 6) to open to reset the registration unit and the solenoid controlling the piston 80 is deenergized to allow the entrance clamp 72 to open. When the entrance clamp 72 is open the cams 98 cause the accumulator 76 to start down to push web material between the rollers 126 and the cam 54 closes switch 254 to energize the solenoid controlling the trim cylinder 78 to cause the roller 100 connected thereto to start its downward movement. As the trim cylinder 78 is fully extended downward the cams 98 cause four of the other rollers to complete the downward movement to pull in approximately 95% of the required amount of web material for the next cycle. Cam 98a continues to pull web material at a slow rate and at about the same time cam 58 closes switch 252 to energize photocell 50 to scan the web material to detect the indicia printed thereon. When the indicia is pulled into correct position the photocell 50 will then act, causing the entrance clamp 72 to close and the trim cylinder 78 to retract. The cam 98a completes its pull on the web left slack by the trim cylinder. A measured amount of paper is now between the entrance and exit clamps 72 and 74 which at this moment are both closed. The punch 128 and heater platens 152 complete the punching of holes in the punch chamber 36 and the heat sealing of tabs in the heat sealing chamber 38. Just as the above operations are being completed the cam 56 (FIGS. 2 and 5) closes the switch 258 to energize a solenoid to cause the piston member to start down to lower the drive roll 245 down onto the paper against the nip roll 260. Shortly after the switch 258 is closed, the accumulator exit cam causes the exit clamp to open. Then the drive roll 245 pulls the web material forward until the switch 258 opens to cause the piston 246 to pull the drive roll 245 upwardly. Then the cycle is repeated to provide another section of web material with pull tabs heat sealed thereon.

It should be kept in mind that basically the machine is performing three operations simultaneously to provide an efficient rapid operating machine. These basic operations consist of accumulating web material in one portion of the machine while the web material is being punched at another position and pull tabs are being heat sealed thereto at a third position.

Although I have described in detail the preferred embodiments of my invention, I contemplate that many changes may be made without departing from the scope or spirit of my invention and I desire to be limited only by the claims.

That which is claimed is:

1. Packaging material comprising: an elongated web of material, said web of material having a longitudinal center line, a plurality of openings in said web of material with each next adjacent opening in said material being alternately located on one side of said center line and then on the other side of said center line the same distance, each of adjacent openings being spaced the same longitudinal distance from each other and tabs heat sealed over each of said openings.

2. The packaging material of claim 1 wherein said elongated web of material is rolled up whereby the outside diameters on each side of said roll are substantially equal.

References Cited

UNITED STATES PATENTS

| | | | |
|---|---|---|---|
| 3,287,878 | 11/1966 | Mobley | 93—35 PT |
| 3,446,344 | 5/1969 | Paxton | 206—59 F |
| 3,166,226 | 1/1965 | Mobley | 229—7 R |
| 3,361,611 | 1/1968 | Stark | 229—7 R |
| 3,552,631 | 1/1971 | Fuchs | 229—22 |

WILLIAM T. DIXSON, JR., Primary Examiner

U.S. Cl. X.R.

93—35 PT, 61 A; 116—113; 156—250; 229—3.5 R